United States Patent
Quan et al.

(10) Patent No.: US 9,210,203 B2
(45) Date of Patent: *Dec. 8, 2015

(54) RESOURCE BASED MOBILE DEVICE APPLICATION STREAMING

(71) Applicant: Nextbit Systems Inc., San Francisco, CA (US)

(72) Inventors: Justin Quan, San Francisco, CA (US); Michael A. Chan, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/158,733

(22) Filed: Jan. 17, 2014

(65) Prior Publication Data

US 2014/0136664 A1    May 15, 2014

Related U.S. Application Data

(63) Continuation-in-part of application No. 13/865,515, filed on Apr. 18, 2013.

(60) Provisional application No. 61/708,794, filed on Oct. 2, 2012.

(51) Int. Cl.
```
G06F 15/16    (2006.01)
H04L 29/06    (2006.01)
H04L 29/08    (2006.01)
G06F 9/445    (2006.01)
```

(52) U.S. Cl.
CPC ........ *H04L 65/4069* (2013.01); *G06F 9/44521* (2013.01); *H04L 65/4084* (2013.01); *H04L 65/602* (2013.01); *H04L 67/06* (2013.01); *H04L 67/34* (2013.01)

(58) Field of Classification Search
CPC ..... G06F 15/16; G06F 8/60; G06G 17/30218; H04L 65/607; H04L 63/58
See application file for complete search history.

(56) References Cited

U.S. PATENT DOCUMENTS 6,811,486 B1    11/2004    Luciano, Jr.
7,315,740 B2    1/2008     Maes
(Continued)

FOREIGN PATENT DOCUMENTS

EP    2680207 A1    1/2014

OTHER PUBLICATIONS

Co-Pending U.S. Appl. No. 14/228,190 by Quan, J., et al., filed Mar. 27, 2014.
(Continued)

*Primary Examiner* — Djenane Bayard

(57) ABSTRACT

Technology for decomposing an application into fragments and streaming the application in fragments is disclosed herein. According to at least one embodiment, a computer-implemented method includes steps of determining multiple application fragments of a computer application, wherein each application fragment of the application fragments includes a code to present at least one interface of the computer application; storing the application fragments at a storage device; generating a resource dependency data structure, wherein for each specific application fragment of the application fragments, the resource dependency data structure includes identifications of resources that are needed for running the specific application fragment; and streaming, via a network component, at least one application fragment of the application fragments to a computing device.

23 Claims, 6 Drawing Sheets

(56) References Cited

U.S. PATENT DOCUMENTS

| | | |
|---|---|---|
| 7,326,117 B1 | 2/2008 | Best |
| 7,490,045 B1 | 2/2009 | Flores et al. |
| 7,774,457 B1 | 8/2010 | Talwar et al. |
| 7,903,383 B2 | 3/2011 | Fukano et al. |
| 8,005,956 B2 | 8/2011 | Williams et al. |
| 8,234,348 B1 | 7/2012 | Tulchinsky et al. |
| 8,290,920 B2 | 10/2012 | Mahajan et al. |
| 8,315,977 B2 | 11/2012 | Anand et al. |
| 8,423,511 B1 | 4/2013 | Bhatia |
| 8,438,298 B2 | 5/2013 | Arai et al. |
| 8,473,577 B2 | 6/2013 | Chan |
| 8,475,275 B2 | 7/2013 | Weston et al. |
| 8,478,816 B2 | 7/2013 | Parks et al. |
| 8,494,576 B1 | 7/2013 | Bye et al. |
| 8,495,129 B2 | 7/2013 | Wolman et al. |
| 8,515,902 B2 | 8/2013 | Savage |
| 8,539,567 B1 | 9/2013 | Logue et al. |
| 8,577,292 B2 | 11/2013 | Huibers |
| 8,589,140 B1 * | 11/2013 | Poulin .......................... 703/22 |
| 8,606,948 B2 | 12/2013 | Evans et al. |
| 8,666,938 B1 | 3/2014 | Pancholy |
| 8,747,232 B1 | 6/2014 | Quan et al. |
| 8,764,555 B2 | 7/2014 | Quan et al. |
| 8,775,449 B2 | 7/2014 | Quan et al. |
| 8,812,601 B2 | 8/2014 | Hsieh et al. |
| 8,840,461 B2 | 9/2014 | Quan et al. |
| 8,868,859 B2 | 10/2014 | Schmidt et al. |
| 2001/0039212 A1 | 11/2001 | Sawano et al. |
| 2002/0161908 A1 | 10/2002 | Benitez et al. |
| 2003/0069037 A1 | 4/2003 | Kiyomoto et al. |
| 2004/0203381 A1 | 10/2004 | Cahn et al. |
| 2005/0147130 A1 | 7/2005 | Hurwitz et al. |
| 2006/0030408 A1 | 2/2006 | Kiiskinen |
| 2006/0073788 A1 | 4/2006 | Halkka et al. |
| 2007/0130217 A1 | 6/2007 | Linyard et al. |
| 2008/0055311 A1 | 3/2008 | Aleksic et al. |
| 2008/0220878 A1 | 9/2008 | Michaelis |
| 2009/0063690 A1 | 3/2009 | Verthein et al. |
| 2009/0077263 A1 | 3/2009 | Koganti et al. |
| 2009/0106110 A1 | 4/2009 | Stannard et al. |
| 2009/0204966 A1 | 8/2009 | Johnson et al. |
| 2009/0282125 A1 | 11/2009 | Jeide et al. |
| 2010/0173712 A1 | 7/2010 | Buhr |
| 2010/0235511 A1 | 9/2010 | Kai |
| 2010/0257403 A1 | 10/2010 | Virk et al. |
| 2010/0332401 A1 | 12/2010 | Prahlad et al. |
| 2011/0076941 A1 | 3/2011 | Taveau et al. |
| 2011/0078319 A1 | 3/2011 | Ishida |
| 2011/0093567 A1 | 4/2011 | Jeon et al. |
| 2011/0106755 A1 | 5/2011 | Hao et al. |
| 2011/0126168 A1 | 5/2011 | Ilyayev |
| 2011/0219105 A1 | 9/2011 | Kryze et al. |
| 2011/0252071 A1 | 10/2011 | Cidon |
| 2011/0275316 A1 | 11/2011 | Suumäet al. |
| 2011/0286026 A1 | 11/2011 | Matsuzawa |
| 2011/0313922 A1 | 12/2011 | Ben Ayed |
| 2012/0017236 A1 | 1/2012 | Stafford et al. |
| 2012/0023250 A1 | 1/2012 | Chen et al. |
| 2012/0028714 A1 | 2/2012 | Gagner et al. |
| 2012/0036218 A1 | 2/2012 | Oh et al. |
| 2012/0036239 A1 | 2/2012 | Donaghey et al. |
| 2012/0079095 A1 | 3/2012 | Evans et al. |
| 2012/0079126 A1 | 3/2012 | Evans et al. |
| 2012/0084803 A1 | 4/2012 | Johansson et al. |
| 2012/0110568 A1 | 5/2012 | Abel et al. |
| 2012/0149309 A1 | 6/2012 | Hubner et al. |
| 2012/0171951 A1 | 7/2012 | 'T Hooft |
| 2012/0203932 A1 | 8/2012 | da Costa et al. |
| 2012/0210343 A1 | 8/2012 | McCoy et al. |
| 2012/0303778 A1 * | 11/2012 | Ahiska et al. .................. 709/223 |
| 2012/0311820 A1 | 12/2012 | Chang |
| 2013/0007203 A1 | 1/2013 | Szu |
| 2013/0008611 A1 | 1/2013 | Marcus et al. |
| 2013/0044106 A1 | 2/2013 | Shuster et al. |
| 2013/0045795 A1 | 2/2013 | Fiedler |
| 2013/0086114 A1 | 4/2013 | Wilson et al. |
| 2013/0117806 A1 | 5/2013 | Parthasarathy et al. |
| 2013/0159890 A1 * | 6/2013 | Rossi ........................... 715/762 |
| 2013/0219381 A1 | 8/2013 | Lovitt |
| 2013/0223240 A1 * | 8/2013 | Hayes et al. .................. 370/252 |
| 2013/0225087 A1 | 8/2013 | Uhm |
| 2013/0304898 A1 | 11/2013 | Aggarwal et al. |
| 2014/0040239 A1 | 2/2014 | Hirsch |
| 2014/0053054 A1 | 2/2014 | Shen et al. |
| 2014/0101300 A1 * | 4/2014 | Rosensweig et al. ......... 709/223 |
| 2014/0170978 A1 | 6/2014 | Wolman et al. |
| 2014/0215030 A1 | 7/2014 | Terwilliger et al. |

OTHER PUBLICATIONS

Co-Pending U.S. Appl. No. 14/042,567 by Chan, M.A., et al., filed Sep. 30, 2013.
Co-Pending U.S. Appl. No. 14/042,398 by Chan, M.A., et al., filed Sep. 30, 2013.
Design U.S. Appl. No. 29/486,424 by Chan, M.A., et al., filed Mar. 28, 2014.
Non-Final Office Action mailed Apr. 3, 2014, U.S. Appl. No. 14/158,682 by Quan, J., et al., filed Jan. 17, 2004.
Non-Final Office Action mailed Apr. 2, 2014, U.S. Appl. No. 14/179,709 by Quan, J., et al., filed Feb. 13, 2014.
Co-Pending U.S. Appl. No. 13/772,163 by Quan, J., filed Feb. 20, 2013.
Co-Pending U.S. Appl. No. 14/043,034 by Chan, M.A., et al., filed Oct. 1, 2013.
Co-Pending U.S. Appl. No. 14/158,682 by Quan, J., et al., filed Jan. 17, 2004.
Co-Pending U.S. Appl. No. 14/158,715 by Quan, J., et al., filed Jan. 17, 2014.
Co-Pending U.S. Appl. No. 14/173,680 by Quan, J., et al., filed Feb. 5, 2014.
Co-Pending U.S. Appl. No. 14/167,834 by Quan, J., et al., filed Jan. 29, 2014.
Co-Pending U.S. Appl. No. 13/865,515 by Quan, J., et al., filed Apr. 18, 2013.
Co-Pending U.S. Appl. No. 14/160,444 by Quan, J., et al., filed Jan. 21, 2014.
Co-Pending U.S. Appl. No. 14/167,939 by Quan, J., et al., filed Jan. 29, 2014.
Co-Pending U.S. Appl. No. 14/042,509 by Chan, M.A., et al., filed Sep. 30, 2013.
International Search Report and Written Opinion mailed Feb. 3, 2014, 7 pp., for International Application No. PCT/US13/62729 filed Sep. 30, 2013.
International Search Report and Written Opinion mailed Feb. 3, 2014, 9 pp., for International Application No. PCT/US13/62986 filed Oct. 2, 2013.
International Search Report and Written Opinion mailed Feb. 3, 2014, 7 pp., for International Application No. PCT/2013/62737 filed Sep. 30, 2013.
Co-Pending U.S. Appl. No. 14/221,174 by Chan, M.A., et al., filed Mar. 20, 2014.
Co-Pending U.S. Appl. No. 14/251,463 by Quan, J., et al., filed Apr. 11, 2014.
Co-Pending U.S. Appl. No. 14/252,674 by Chan, M.A., et al., filed Apr. 14, 2014.
Notice of Allowance mailed Apr. 15, 2014, U.S. Co-pending U.S. Appl. No. 14/167,834, by Quan et al., filed Jan. 29, 2014.
Co-Pending U.S. Appl. No. 14/179,709 by Quan, J., et al., filed Feb. 13, 2014.
Co-Pending U.S. Appl. No. 14/179,744 by Quan, J., et al., filed Feb. 13, 2014.
Non-Final Office Action mailed Mar. 7, 2014, Co-pending U.S. Appl. No. 14/158,715, by Quan et al., filed Jan. 17, 2014.
Non-Final Office Action mailed Mar. 10, 2014, Co-pending U.S. Appl. No. 14/173,680, by Quan et al., filed Feb. 5, 2014.
Final Office Action mailed Jul. 24, 2014, U.S. Appl. No. 14/179,709 by Quan, J., et al., filed Feb. 13, 2014.
Final Office Action mailed Nov. 6, 2014, U.S. Appl. No. 14/158,682 by Quan, J., et al., filed Jan. 17, 2004.

(56) References Cited

OTHER PUBLICATIONS

International Search Report mailed Sep. 11, 2014, 7 pps., for International Application No. PCT/2013/031488 filed Mar. 21, 2014.
Layton, J.B., "User Space File Systems," Linux Magazine, accessed at http://www.linux-mag.com/id/7814, Jun. 22, 2010, pp. 1-4.
Non Final Office Action mailed Nov. 3, 2014, for U.S. Appl. No. 13/772,163 by Quan, J., filed Feb. 20, 2013.
Non Final Office Action mailed Oct. 23, 2014, for U.S. Appl. No. 14/252,674 by Chan, M.A., et al., filed Apr. 14, 2014.
Non-Final Office Action mailed Aug. 26, 2014, for U.S. Appl. No. 14/267,823 by Chan, M.A., et al., filed May 1, 2014.
Notice of Allowance mailed Aug. 12, 2014, U.S. Appl. No. 14/179,709 by Quan, J., et al., filed Feb. 13, 2014.
Notice of Allowance mailed Sep. 3, 2014, U.S. Appl. No. 14/160,444 by Quan, J., et al., filed Jan. 21, 2014.
Restriction Requirement mailed Aug. 29, 2014, for U.S. Appl. No. 14/252,674 by Chan, M.A., et al., filed Apr. 14, 2014.
U.S. Appl. No. 14/479,087 by Chan, M.A et al., filed Sep. 5, 2014.
U.S. Appl. No. 14/479,140 by Chan, M.A et al., filed Sep. 5, 2014.
Notice of Allowance mailed May 20, 2014, Co-pending U.S. Appl. No. 14/173,680, by Quan et al., filed Feb. 5, 2014.
Non-Final Office Action mailed May 8, 2014, U.S. Appl. No. 14/179,744 by Quan, J., et al., filed Feb. 13, 2014.
Non-Final Office Action mailed May 9, 2014, U.S. Appl. No. 14/160,444 by Quan, J., et al., filed Jan. 21, 2014.
Co-Pending U.S. Appl. No. 14/267,823 by Chan, M.A., et al., filed May 1, 2014.
Notice of Allowance mailed May 14, 2014, Co-pending U.S. Appl. No. 14/158,715, by Quan et al., filed Jan. 17, 2014.
Non-Final Office Action mailed Jun. 9, 2014, for U.S. Appl. No. 14/167,939 by Quan, J., et al., filed Jan. 29, 2014.
Restriction Requirement mailed Jun. 12, 2014, for U.S. Appl. No. 14/251,463 by Quan, J., et al., filed Apr. 11, 2014.
McCormick, Z. And Schmidt, D. C., "Data Synchronization Patterns in Mobile Application Design," Vanderbilt University, pp. 1-14 (2012).
Notice of Allowance mailed Oct. 29, 2014, U.S. Appl. No. 14/167,939, by Quan, J., et al., filed Jan. 29, 2014.
Notice of Allowance mailed Oct. 29, 2014, for U.S. Appl. No. 14/179,744, by Quan, J., et al., filed Feb. 13, 2014.
Notice of Allowance mailed Nov. 25, 2014, for U.S. Appl. No. 14/252,674, by Chan, M.A., et al., filed Apr. 14, 2014.
Non Final Office Action mailed Dec. 3, 2014, for U.S. Appl. No. 14/251,463, by Quan, J., et al., filed Apr. 11, 2014.
Notice of Allowance mailed Dec. 4, 2014, for U.S. Appl. No. 14/479,140, by Chan, M.A., et al., filed Sep. 5, 2014.
Notice of Allowance mailed Dec. 12, 2014, for U.S. Appl. No. 14/479,140, by Chan, M.A., et al., filed Sep. 5, 2014.
Notice of Allowance mailed Dec. 17, 2014, for U.S. Appl. No. 14/267,823, by Chan, M.A., et al., filed May 1, 2014.
Notice of Allowance mailed Dec. 19, 2014, for U.S. Appl. No. 14/479,140, by Chan, M.A., et al., filed Sep. 5, 2014.
Notice of Allowance mailed Dec. 22, 2014, for U.S. Appl. No. 14/179,744, by Quan, J., et al., filed Feb. 13, 2014.
Notice of Allowance mailed on Mar. 30, 2015, for U.S. Appl. No. 13/772,163, by Quan, J., filed on Feb. 20, 2013.
Notice of Allowance mailed on Mar. 30, 2015, for U.S. Appl. No. 14/267,823, by Chan, M.A., et al., filed on May 1, 2014.
Non-Final Office Action mailed on Apr. 8, 2015, for U.S. Appl. No. 13/865,515, by Quan, J., et al., filed on Apr. 18, 2013.
Non-Final Office Action mailed Apr. 8, 2015, for U.S. Appl. No. 14/228,190, by Quan, J., et al., filed on Mar. 27, 2014.
Notice of Allowance mailed on Apr. 15, 2015, for U.S. Appl. No. 14/479,140, by Chan, M.A., et al., filed on Sep. 5, 2014.
Non-Final Office Action mailed May 15, 2015, for U.S. Appl. No. 14/042,398, by Chan, M.A., et al., filed Sep. 30, 2013.
Non-Final Office Action mailed Jul. 20, 2015, for U.S. Appl. No. 14/042,509, of Chan, M.A., et al., filed Sep. 30, 2013.
Non-Final Office Action mailed Aug. 21, 2015, for U.S. Appl. No. 14/042,567, of Chan, M.A., et al., filed Sep. 30, 2013.
Notice of Allowance mailed Sep. 2, 2015, for U.S. Appl. No. 14/042,398, of Chan, M.A., et al., filed Sep. 30, 2013.
Final Office Action mailed Sep. 9, 2015, for U.S. Appl. No. 14/251,463, of Quan, J., et al., filed Apr. 11, 2014.
Notice of Allowance mailed Oct. 2, 2015, for U.S. Appl. No. 14/228,190, of Quan, J., et al., filed Mar. 27, 2014.
Notice of Allowance mailed Oct. 7, 2015, for U.S. Appl. No. 13/865,515, of Quan, J., et al., filed Apr. 18, 2013.
U.S. Appl. No. 14/804,696, of Quan, J., et al., filed Jul. 21, 2015.
U.S. Appl. No. 14/835,981, of Chu, B., et al., filed Aug. 26, 2015.
U.S. Appl. No. 14/840,611, of Chan, M.A., et al., filed Aug. 31, 2015.
U.S. Appl. No. 14/840,636, of Chan, M.A., et al., filed Aug. 31, 2015.

* cited by examiner

RESOURCE BASED MOBILE DEVICE APPLICATION STREAMING

PRIORITY CLAIM

This application is a continuation-in-part of U.S. patent application Ser. No. 13/865,515, entitled "MOBILE DEVICE APPLICATION STREAMING", which was filed on Apr. 18, 2013, which claims the benefit of U.S. Provisional Patent Application No. 61/708,794, entitled "CLOUD COMPUTING INTEGRATED OPERATING SYSTEM", which was filed on Oct. 2, 2012, all of which are incorporated by reference herein in its entirety

FIELD OF THE INVENTION

At least one embodiment of the present invention pertains to mobile device applications, and more particularly, to streaming of mobile applications designed to run on mobile devices.

BACKGROUND

In recent years, the use of wireless networks to distribute content within a service area thereof has become increasingly common. For example, a mobile device within range of a base station of a third generation (3G) or fourth generation (4G) cellular network is capable of "pulling content" from a remote server, for example, a content server, coupled to the base station. A mobile device can download a mobile application from an application distribution platform via a wireless network such as a WiFi or cellular network. Even with the increasing network speed of the modern WiFi and cellar networks, it can still take a significant time to download a large mobile application. A user of the mobile device has to wait for the download to be finished before the user can start installing and running the mobile application on the mobile device. Even for a user only wants to try a small percentage of the functionalities or stages of a mobile application, the user still need to download the whole application before the user can try any portion of the application.

Furthermore, a modern application can include a large amount multimedia content and can have a size of several gigabytes (GBs). A user of a mobile device may find that the mobile device does not have enough available storage space to accommodate the application. Therefore, the user may be forced to delete some of the existing applications or files stored on the mobile device, in order to run the application.

SUMMARY

Technology introduced here provides a mechanism to enable a user to run an application on a computing device before the whole application has been downloaded to the computing device. A processing server can decompose an application into a plurality of fragments. Each fragment of the application corresponds to one or more user interfaces, such as activities in an Android environment or views in an iOS environment. Resources are determined for each user interface. Resources, e.g. images, texts, videos, audios, 3D models, necessary for a specific user interface are included within a corresponding fragment. The dependency relationships between the fragments are also determined.

An application can be launched on a computing device by streaming one of more fragments of the application to the computing device. Fragments are streamed to and cached on the computing device based on the dependency of the fragments. For example, assuming fragments 5 and 6 can be only accessed via fragment 4, if the user is currently active on fragment 4, then fragments 5 and 6 may be prioritized for streaming to the computing device. A server can further determine the probability of each fragment being used based on other users' access patterns.

The application can be decomposed into fragments using a full server processing method. For example, a processing server can run an emulator to execute the application and determine the user interfaces and resources for each fragment of the application. The application can also be decomposed into fragments using a crowd sources device processing. Computing devices that have the full application stored locally can run the application and determine the user interfaces and resources for each fragment of the application. Then the fragmenting information can be updated to a server so that the server can decompose the application on the server accordingly.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
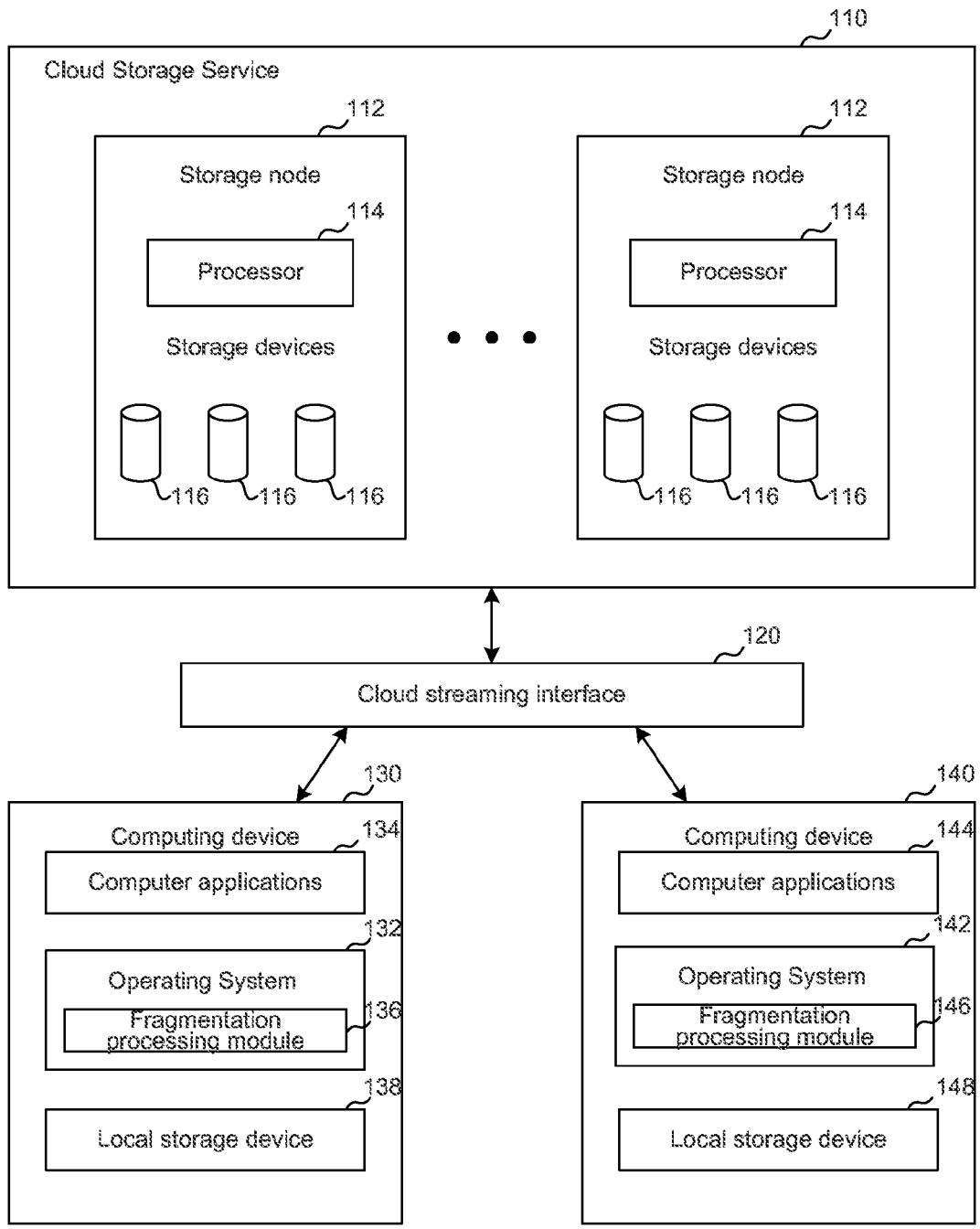
FIG. 1 illustrates an example system for streaming applications to computing devices.

FIG. 1 illustrates an example system for streaming applications computing devices. The system includes a cloud storage service 110 configured to store applications and determine fragmentation of the applications. In one embodiment, the cloud storage service 110 can be a storage cluster having computer nodes interconnected with each other by a network. The storage cluster can communicate with other computing devices via the Internet. The cloud storage service 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud streaming interface 120 can also be included to stream fragments of applications from the cloud storage service to the computing device. The cloud streaming interface 120 can include network communication hardware and network connection logic to receive the information from computing devices. The network can be a local area network (LAN), wide area network (WAN) or the Internet. The cloud streaming interface 120 may include a queuing mechanism to organize fragments to be streamed to the computing devices. The cloud streaming interface 120 can communicate with the cloud storage service 110 to send requests to the cloud storage service 110 for requesting fragments of the applications.

A computing device 130 includes an operating system 132 to manage the hardware resources of the computing device 130 and provides services for running computer applications 134. The computer applications 134 stored in the computing device 130 require the operating system 132 to properly run on the device 130. The computing device 130 can backup application states of the computer applications 134 to the cloud storage service 110. The computing device 130 includes at least one local storage device 138 to store the computer applications, application fragments, and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 includes a fragmentation processing module 136 to process the application fragments streamed from the cloud storage server 110. Similarly, another computing device 140 can also retrieve application fragments from the cloud storage service 110.

Figure 2:
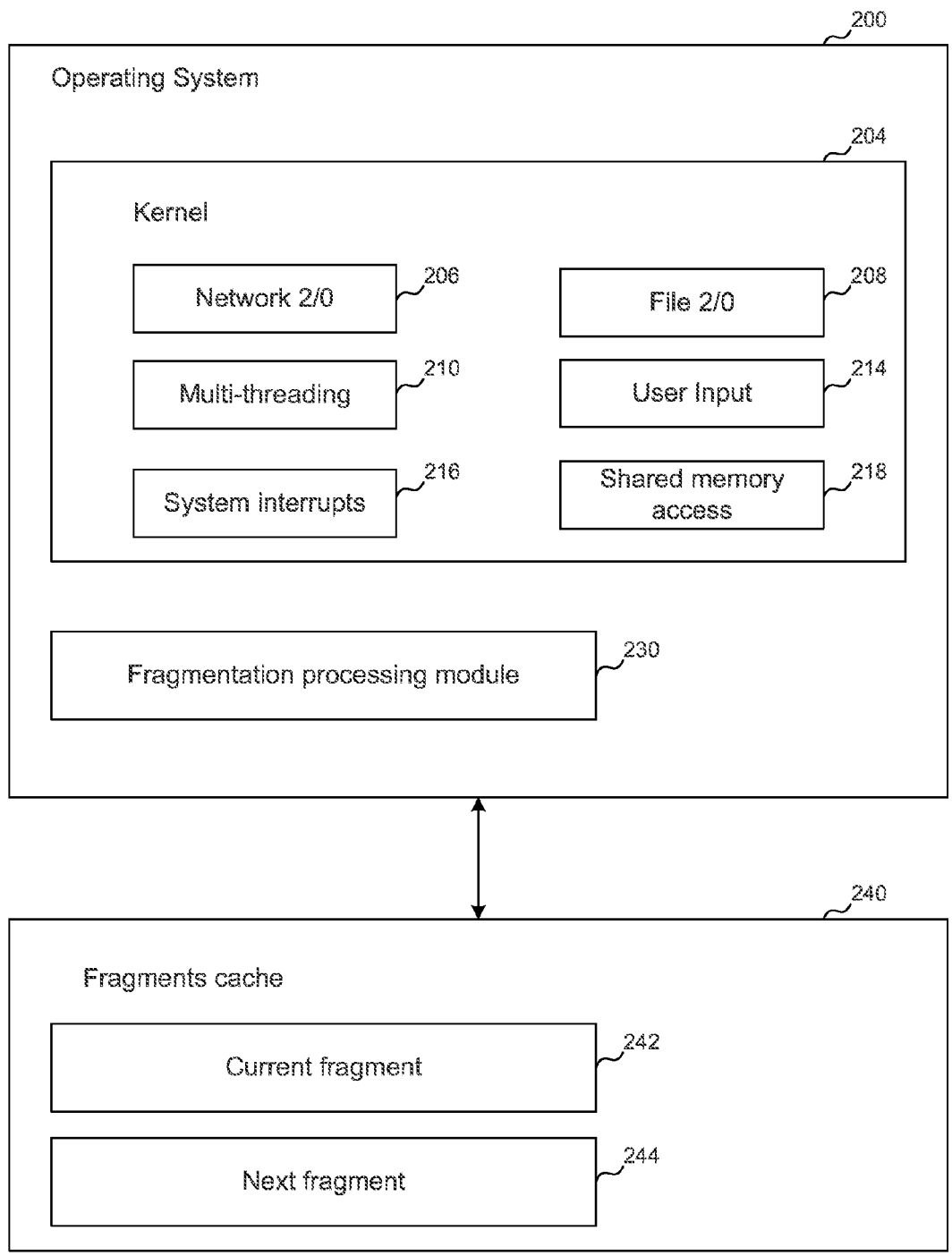
FIG. 2 illustrates an example operating system of a computing device.

FIG. 2 illustrates an example operating system of a computing device, according to one embodiment. The operating system 200 includes a kernel 204. The kernel 204 provides interfaces to hardware of the electronic device for the computer applications running on top of the kernel 204, and supervises and controls the computer applications. The kernel 204 isolates the computer applications from the hardware. The kernel 204 may include one or more intervening sources that can affect execution of a computer application. In one embodiment, the kernel 204 includes a network I/O module 206, a file I/O module 208, multi-threading module 210, user input 214, system interrupts 216, and shared memory access 218.

A fragmentation processing module 230 runs on top of the kernel 204. The fragmentation processing module 230 processes the application fragments retrieved from the cloud storage service and runs the application as that the entire application has been stored in the computing device. In the example of FIG. 2, a fragments cache 240 includes a current fragment 242 that currently run on top of the operating system 300. The fragments cache 240 can further include a next fragment 244 that is ready to start seamlessly after the current fragment 242.

Figure 3:
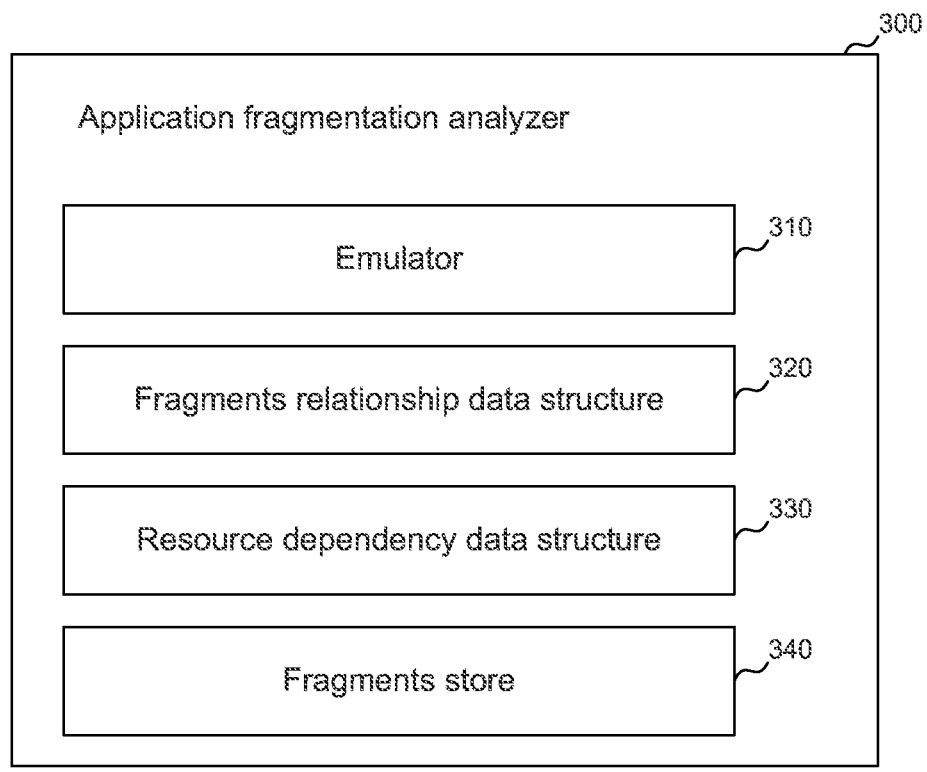
FIG. 3 illustrates an example of an application fragmentation analyzer.

FIG. 3 illustrates an example of an application fragmentation analyzer. The application fragmentation analyzer can be used by a storage server or a cloud storage service, such as the cloud storage service 110 as illustrated in FIG. 1. For example, the application fragmentation analyzer can run on the cloud storage service 110 to decompose an application into fragments. As illustrated in FIG. 3, the application fragmentation analyzer 300 includes an emulator 310 to execute the application determine the user interfaces and resources for each fragment of the application. The emulator 310 simulates an environment as a computing device on which the application runs.

By running the application on the emulator 310, the application fragmentation analyzer 300 can determine a plurality of fragments of the application. Each fragment corresponds to one or more user interfaces of the application. In an embodiment, the fragment is determined by determining the resources required to run and/or display at least one user interface. In an embodiment, a user interface is a related portion of an application. As a first example, video games frequently contain levels, and users by completing tasks or taking certain actions advance to a next level. One user interface corresponds to a first level of the video game, and the application fragment includes the resources required to run and/or display the first level. A second user interface corresponds to a second level of the video game, and the application fragment includes the resources required to run and/or display the second level. While playing the video game in the first level, the first application fragment is being run. In response to the user advancing to the second level, the second application fragment is run.

As another example, a first user interface corresponds to a first scene in the video game, and a second user interface corresponds to a second scene. The first scene takes place in a virtual geography local to an island, and the second scene takes place in a virtual geography local to a cave. One application fragment includes the resources to run and/or display the virtual geography local to the island, and a second application fragment includes the resources to run and/or display the virtual geography local to the cave. In response to the scene transitioning from the island to the cave, the second application fragment is run.

As another example, a first user interface corresponds to a first level of a video game, and a second user interface corresponds to a help portion of the video game. The second application fragment includes the resources needed to run and/or display a help system. In response to a user indicating a need for help while in the first level, such as by clicking a help button, the second application fragment is run.

As another example, a first user interface corresponds to a first activity in a productivity application and a second user interface corresponds to a second activity in the productivity application. The productivity application is Excel, and the first activity is entering data into a worksheet. The second activity is generating and displaying graphs based on the data. The first application fragment includes the resources to run and/or display the interface used by the user to enter the data, and the second application fragment includes the resources to run and/or display the interface used by the user to generate and view the graphs. In response to the user indicating a desire to generate a graph, such as by selecting a graph generation menu item, the second application fragment is run.

As additional examples, for an Android application, a user interface can include an activity of the Android application. For an iOS application, a user interface can include a view of the iOS application. For a HTML5 application, a user interface can include a page of the HTML5 application.

Once the fragments are determined, the application fragmentation analyzer 300 further generates a fragments relationship data structure 320. The fragments relationship data structure 320 includes the information whether a fragment can lead ("link") to another fragment during the operation of the application. For example, assuming fragments 5 and 6 can be accessed via fragment 4, the fragments relationship data structure 320 can includes information that fragment 4 can lead to fragments 5 and 6.

The application fragmentation analyzer 300 can further generate a resource dependency data structure 330. The resource dependency data structure 330 includes information regarding the resources needed for running each fragment of the application. The resources can include images, icons, texts, audios, videos, 3D models, or other data included in the application. For instance, if a fragment 3 of the application needs to display an image A and play an audio clip B during the operation of the fragment 3 of the application, the resource dependency data structure 330 includes information that fragment 3 needs the image A and audio clip B.

Based on the information in the fragments relationship data structure 320 and the resource dependency data structure 330, the application fragmentation analyzer 300 can generate the fragments of the application in a fragments store 340. The fragments store 340 includes all the fragments of the application. In one embodiment, each specific fragment can include the resources that the specific fragment needs. In another embodiment, a fragment does not include all resources that the fragment needs. When the fragment is transmitted to a computing device, the corresponding resources are transmitted along with the fragment according to the resource dependency data structure 330.

The application fragmentation analyzer 300 decomposes an application into fragments. A computing device can download enough fragments to run the application at the current status, instead of downloading the entire application. The computer device can further download and cache the fragments that would possibly follows the fragment currently running.

The application fragmentation analyzer 300 automatically determines the fragments of the application, without human intervention. The developer of the application does not need to do any extra work for decomposing the application into fragments. The application fragmentation analyzer 300 automatically determines the fragments based on the flow of the application and the resources dependency information.

In some other embodiments, the application fragmentation analyzer can be used by as a crowd sources device processing. Computing devices that have the full application or a portion of the application stored locally can use the application fragmentation analyzer to determine the user interfaces and resources for each fragment of the application. Then the fragmenting information can be updated to a server so that the server can decompose the application on the server accordingly and streams the fragments to the next requesting computing device. The computing device does not need to determine all fragments of the application. A first computing device can just determine a portion of the application that it has run locally into fragments. This fragmenting information is collected to the server. A second computing device can stream the fragments and may possibly run an even larger portion of the application. The second computing device can generate additional fragments that the first computing device does not generate. Collectively, computing devices can generate the fragments of the application so that the server just needs to use the fragmenting information to stream the fragments to a device that requests the application in the future.

In one embodiment, the fragments of the application can be in native code format for the operating system of the computing device. In another embodiment, the fragments can be in an interpretative or markup language such as HTML5 (Hyper-Text Markup Language 5).

In one embodiment, the operating system of the computing device includes a fragment module to process and execute the fragments. For instance, when a fragment of an application ends the operation of the fragment and leads to another fragment, the fragment module can immediately stops and cleans up the fragment, and starts running the other fragment. In another embodiment, the computing device runs a launcher program to manage the operations of the fragments of the application. For instance, the launcher program can determine that a running fragment now leads to another fragment, and accordingly starts launching the other fragment immediately.

The fragments can have different versions specifically for different types of client devices. For instance, the fragments can have both English and Chinese versions of the fragments, designed for computing devices with English or Chinese language preference, respectively. The fragments can have different versions for different types of devices, different operating systems, or different mobile operator. For instance, the fragments of an application can have two different versions designed for Android tablets running on Verizon mobile network, and iPhone smart phones running on AT&T mobile network, respectively.

The downloading and caching of the fragments can be dynamically determined by various factors of the computing device. The computing device can monitor the operation of the currently running fragments and predict the next possible fragments to be cached. The computing device can adjust the fragments streaming queue based on the current network transferring speed and the workload of the computing device.

In some embodiments, the computing device can purge ("delete") the fragments that have already been executed and are no longer needed for the current and future operation of the application. This saves the storage space and the computing device and can increase the cache space for caching the incoming fragments for potential future operation of the application.

Figure 4:
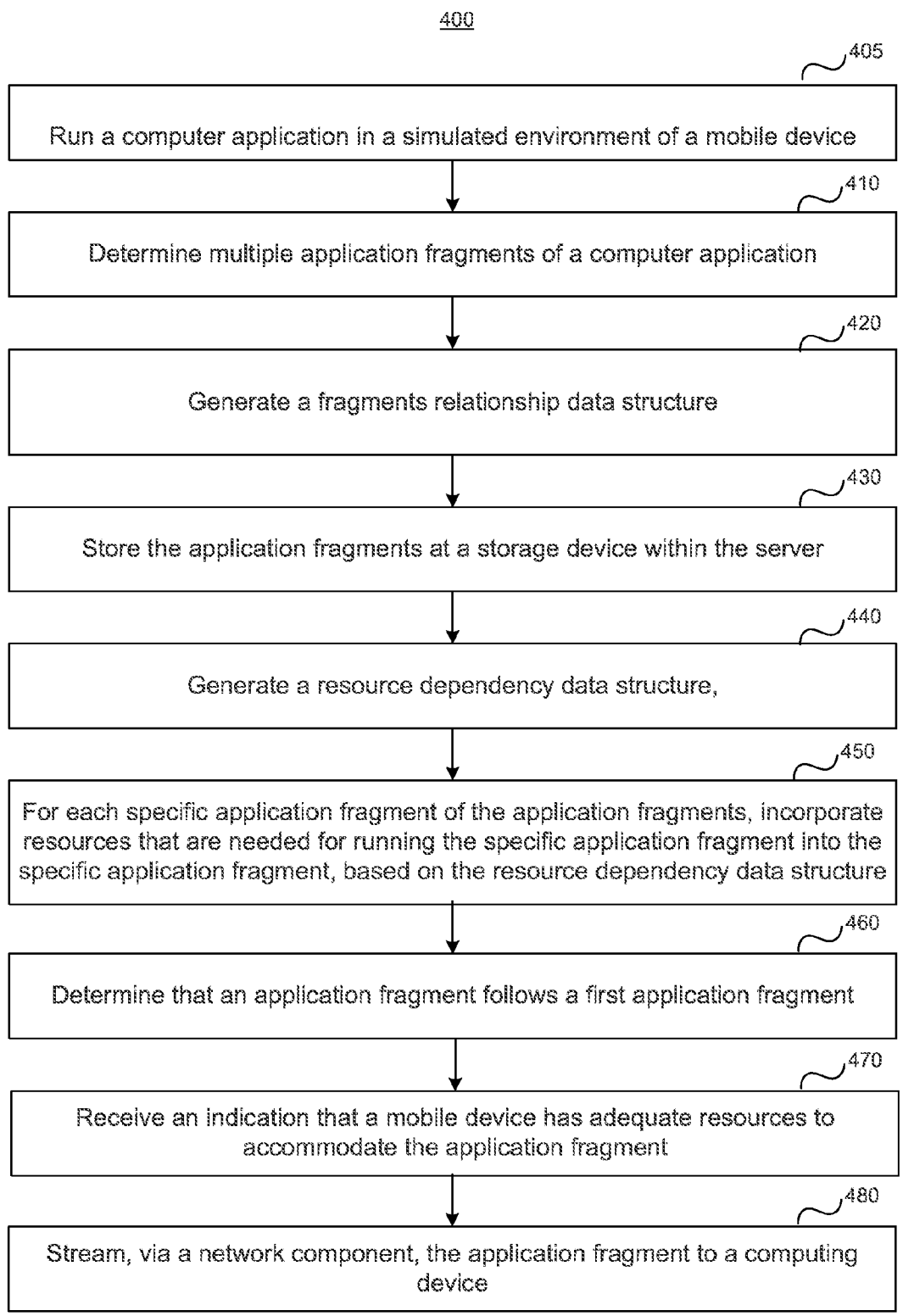
FIG. 4 illustrates an example of an application fragmentation process.

FIG. 4 illustrates an example of an application fragmentation process. The process 400 can be performed by a server, or a computing device as a part of the crowd sourced processing. Although in the embodiment illustrated in FIG. 4, steps are performed by a server, the steps can also be performed by a computing device. At step 405 of the process 400, the server runs a computer application in a simulated environment of a mobile device. At step 410, by running the computer application in the simulated environment, the server determines multiple application fragments of a computer application. Each application fragment of the application fragments includes a code to present at least one interface of the computer application.

At step 420, the server generates a fragments relationship data structure. The fragments relationship data structure includes identifications of application fragments that leads to another application fragment of the application fragments. An application fragment can have multiple next application fragments. For example, a user may be in an application fragment corresponding to a first level of a video game. In one situation, the user advances to a second level of the video game, and the application fragment corresponding to the second level begins to run. In another situation, the user clicks a help button while in the first level application fragment, and the application fragment corresponding to a help system begins to run. In this example, both the second level application fragment and the help system application fragment are next application fragments to the first level application fragment.

At step 430, the server stores the application fragments at a storage device within the server.

At step 440, the server generates a resource dependency data structure, wherein for each specific application fragment of the application fragments, the resource dependency data structure includes identifications of resources that are needed for running the specific application fragment. The resources can include images, icons, texts, audios, videos, 3D models, or other data included in the computer application.

In one embodiment, at step 450, for each specific application fragment of the application fragments, the server incorporates resources that are needed for running the specific application fragment into the specific application fragment, based on the resource dependency data structure. In another alternative embodiment, the resources are not incorporated in the fragments. Instead, the server streams, via the network component, resources that are needed for running the application fragment to the computing device, based on the resource dependency data structure.

At step 460, the server determines that an application fragment follows a first application fragment. In an embodiment, the server accesses the fragments relationship data structure to determine that the application fragment follows the first application fragment. In another embodiment, the server sends the fragments relationship data structure to a computing device, for example a mobile device. The mobile device accesses the fragments relationship data structure to determine that the application fragment follows the first application fragment. The mobile device sends a request for the application fragment to the server based on the determination that the application fragment follows the first application fragment. The server determines that the application fragment follows the first application fragment by receiving the request for the application fragment.

At step 470, the server receives an indication that a mobile device has adequate resources to accommodate an application fragment. In an embodiment, the mobile device determines that it has adequate resources to accommodate the application fragment. The mobile device determines its available resources, determines the resource requirements of the application fragment, and compares the available resources to the required resources to determine if the mobile phone has adequate resources to accommodate the application fragment. The available resources can include an amount of available memory, an available amount of storage, such as an amount of storage available in flash memory, a utilization of a processor, a utilization of a graphic processor, and/or a measure of battery life or charge remaining, among others. The mobile device sends a request for the application fragment to the server based on the determination that it has adequate resources to accommodate the application fragment. The server determines that the application fragment follows the first application fragment by receiving the request for the application fragment.

In an embodiment, the mobile device determines its available resources, and sends resource information including information regarding its available resources to the server. The resource information indicates that the mobile device has adequate resources to accommodate the application fragment, in that the resource information indicates an amount of available resources in excess of the resources required by the application fragment. The server determines the mobile device's available resources based on the mobile device's resource information, determines the resource requirements of the application fragment, and compares the mobile device's available resources to the required resources to determine if the mobile phone has adequate resources to accommodate the application fragment.

At step 480, the server streams, via a network component, the application fragment of the application fragments to a computing device, wherein the application fragment can potentially follow another application fragment currently running on the computer device based on the fragments relationship data structure. In an embodiment, the application fragment is streamed based on the indication of step 470 that the mobile device has adequate resources to accommodate the second application fragment, and based on the fragments relationship data structure indicating that the second application fragment follows the first application fragment during operation of the computer application, as determined in step 460.

Figure 5:
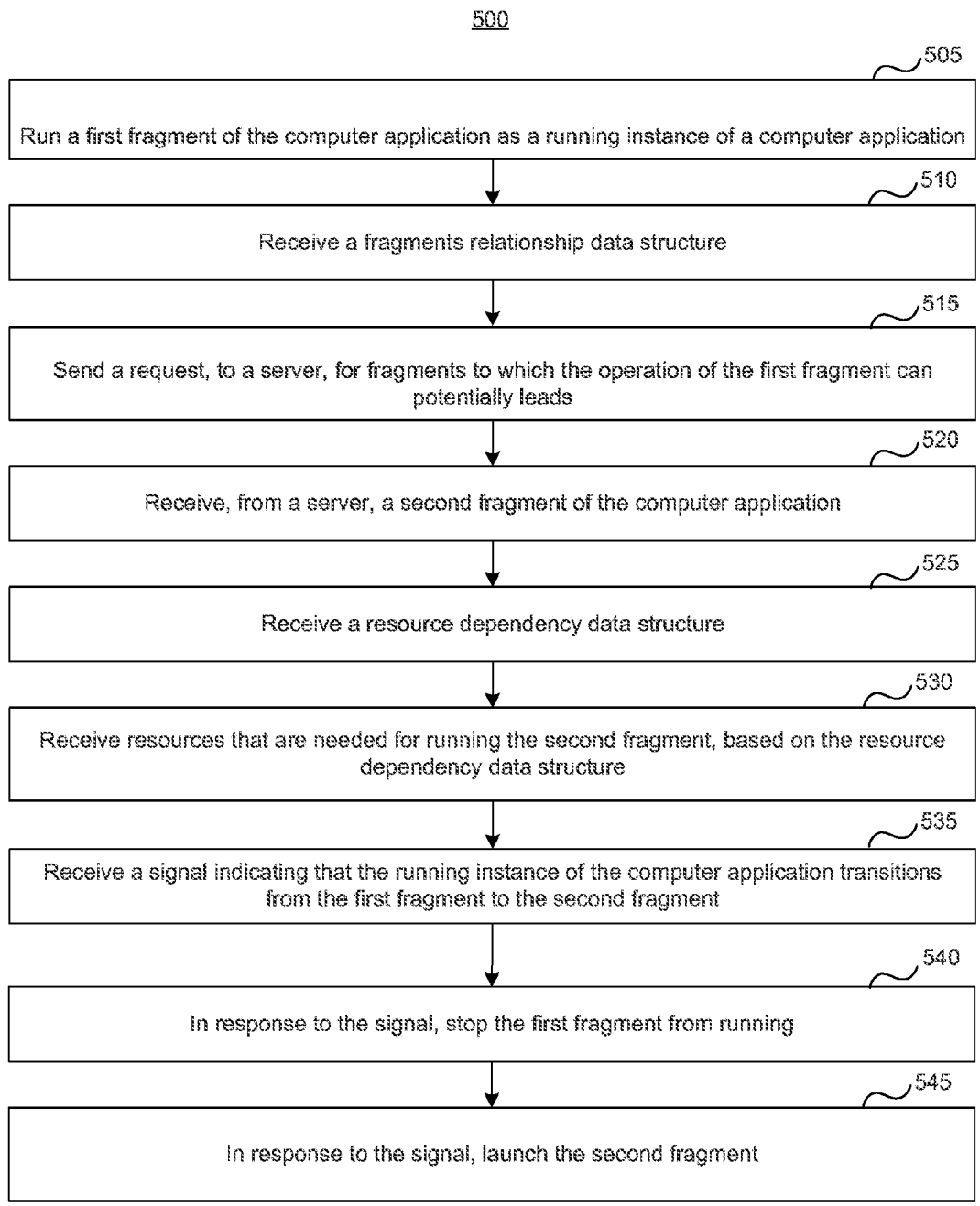
FIG. 5 illustrates an example of a process for receiving and running fragments of an application.

FIG. 5 illustrates an example of a process for receiving and running fragments of an application. At step 505 of the process 500, the computing device runs a first fragment of the computer application as a running instance of a computer application. At step 510, the computing device receives a fragments relationship data structure. The fragments relationship data structure includes identifications of fragments that leads to another fragment of the computer application. In some embodiments, the fragments relationship data structure need not be sent to the computing device. A server uses the fragments relationship data structure to determine fragments to which a first fragment can potentially lead. The server sends a second fragment to the computing device based on the fragments relationship data structure indicating that the second fragment follows the first fragment during operation of the application.

At step 515, the computing device sends a request, to a server, for fragments to which the operation of the first fragment can potentially leads. As discussed related to step 420 of FIG. 3, an application fragment can have multiple next application fragments. In one example, the computing device is running a first fragment, and the first fragment can lead to a second fragment and a third fragment, each respectively at different times of operation. The computing device, while running the first fragment, requests and receives both the second and third fragments. The operation of the application in this instance leads to the third fragment, and does not lead to the second fragment. The computing device deletes the second fragment without having run the second fragment. Further, as discussed related to step 470 of FIG. 4, the request for the fragment can be based on a determination that the device has adequate resources to accommodate a fragment.

At step 520, the computing device receives, from a server, a second fragment of the computer application, wherein operation of the first fragment can potentially leads to the second fragment.

At step 525, the computing device receives a resource dependency data structure. The resource dependency data structure includes identifications of resources that are needed for running fragments of the computer application. At step 530, the computing device receives resources that are needed for running the second fragment, based on the resource dependency data structure. Alternatively, in some other embodiments, the second fragment itself includes resources that are needed for running the second fragment.

At step 535, the computing device receives a signal indicating that the running instance of the computer application transitions from the first fragment to the second fragment. At step 540, in response to the signal, the computing device stops the first fragment from running. At step 545, in response to the signal, the computing device launches the second fragment.

In some other embodiments, a computing device can run a container application responsible for managing, launching and closing the fragments of a computer application. The computing device receives a first fragment of the computer application from a server. Under the control of the container application, the computer device executes the first fragment. The container application can executes the first fragment within the container application itself; or the container application send commands to the operating system of the computing device to execute the first fragment.

Either the container application or the server determines the next fragment that potentially follows the first fragment. In one embodiment, the container application determines a second fragment of the computer application that follows the first fragment, based on a fragments relationship data structure; then the container application requests and receives the second fragment of the computer application from the server. In another embodiment, the container application generates and sends a request to the server for fragments to which an operation of the first fragment can potentially leads; then receives a second fragment determined by the server.

When the first fragment of the computer application ends its execution, the container application launches the second fragment accordingly to continue the execution of the computer application. Therefore, under the control of the container application, the computer application can run seamlessly on the computer device without the need that all fragments of the computer application has to be downloaded to the computing device. The container application can further delete ended fragments (e.g. the first fragment) from the computing device to save local storage space.

Figure 6:
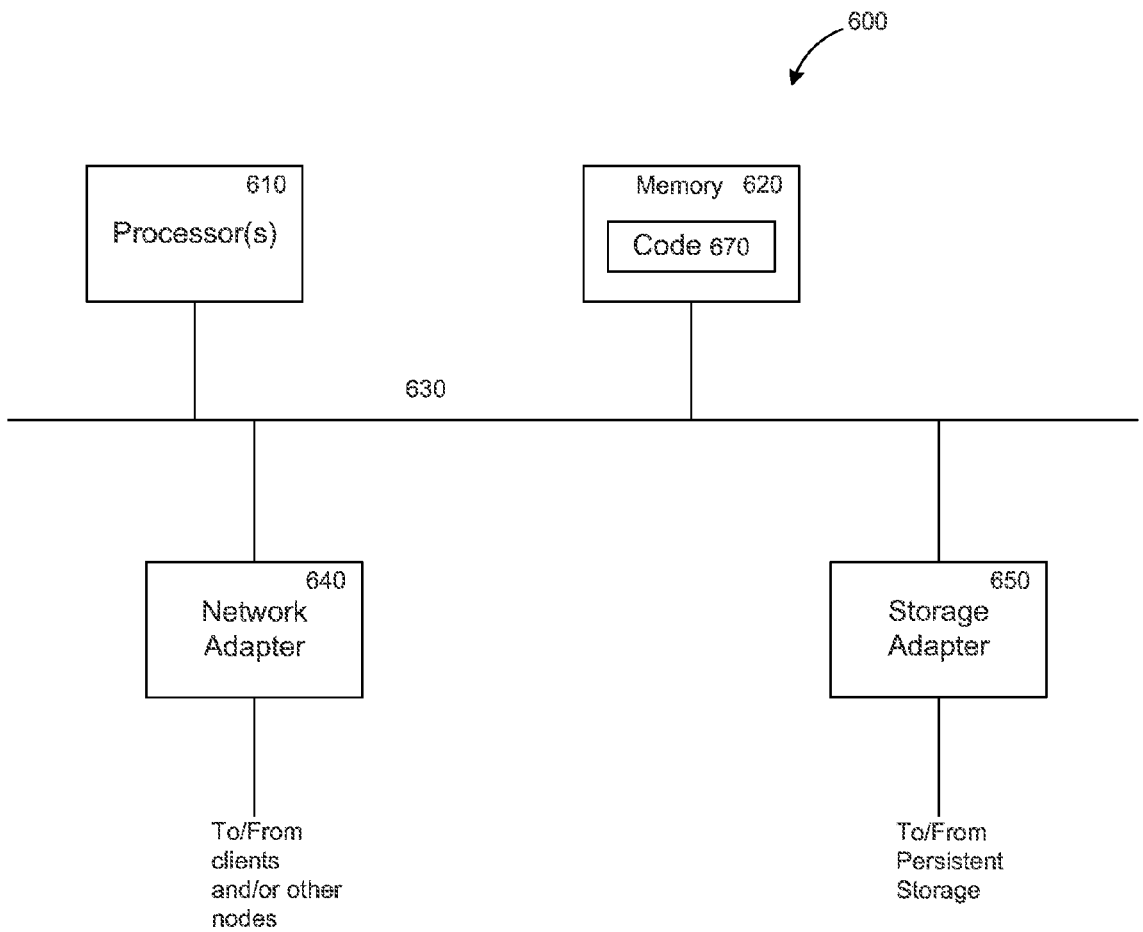
FIG. 6 is a high-level block diagram showing an example of the architecture of a computer, which may represent any computing device or server described herein.

FIG. 6 is a high-level block diagram showing an example of the architecture of a computer 600, which may represent any computing device or server described herein. The computer 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the computer 600 and, thus, control the overall operation of the computer 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computer 600. The memory 620 represents any form of random access memory (RAM), read-only memory (ROM), flash memory, or the like, or a combination of such devices. In use, the memory 620 may contain a code 670 containing instructions according to the technology disclosed herein.

Also connected to the processor(s) 610 through the interconnect 630 are a network adapter 640 and a storage adapter 650. The network adapter 640 provides the computer 600 with the ability to communicate with remote devices, over a network and may be, for example, an Ethernet adapter or Fibre Channel adapter. The network adapter 640 may also provide the computer 600 with the ability to communicate with other computers. The storage adapter 650 allows the computer 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computer 600 by downloading it from a remote system through the computer 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method for streaming an application, the method comprising:
   accessing a first application fragment corresponding to a portion of a computer application, the first application fragment having previously been determined based on an analysis of user interfaces of the computer application such that the first application fragment is capable of displaying at least one user interface;
   receiving, from a mobile device, an indication that the mobile device has adequate resources to accommodate a second application fragment;
   determining that the second application fragment follows the first application fragment based on an access of a fragments relationship data structure, the fragments relationship data structure associating the first application fragment with the second application fragment based on a determination that the second application fragment follows the first application fragment during operation of the computer application; and streaming, via a network interface and to the mobile device, the second application fragment based on the indication that the mobile device has adequate resources to accommodate the second application fragment, and based on the fragments relationship data structure indicating that the second application fragment follows the first application fragment during operation of the computer application,
wherein the first application fragment corresponds to an activity in a first operating environment, wherein the second application fragment corresponds to the activity in a second operating environment, and wherein the second application fragment follows the first application fragment in response to detecting a transition from doing the activity on a first device to doing the activity on a second device, the first device hosting the first operating environment and the second device hosting the second operating environment, the first operating environment being a different type of operating environment from the second operating environment.

2. The method of claim 1, further comprising:
determining that the second application fragment follows the first application fragment by accessing the fragments relationship data structure to obtain an indicator for the second application fragment.

3. The method of claim 1, further comprising:
receiving, from a mobile device, a request for the second application fragment, the mobile device having sent the request based on a determination that the mobile device has adequate resources to accommodate the second application fragment, the request being an indication that the mobile device has adequate resources to accommodate the second fragment, and
based on the fragments relationship data structure indicating that the second application fragment follows the first application fragment during operation of the computer application; and
determining that the second application fragment follows the first application fragment by receiving the request for the second application fragment, the request sent based on the access of the fragments data structure, the access indicating that the second application fragment follows the first application fragment during operation of the computer application.

4. The method of claim 1, wherein the first application fragment corresponds to a first user interface that corresponds to displaying a first level of a video game, wherein the second application fragment corresponds to a second user interface that corresponds to displaying a second level of a video game, and wherein the second application fragment follows the first application fragment in response to a transition from the first level of the video game to the second level of the video game.

5. The method of claim 1, wherein the first application fragment was determined based on an analysis of a first user interface corresponding to a first level of a video game such that the first application fragment is capable of displaying the first level of the video game, and wherein the second application fragment was determined based on an analysis of a second user interface corresponding to a second level of a video game such that the second application fragment is capable of displaying the second level of the video game.

6. The method of claim 1, wherein the first application fragment corresponds to a first user interface and includes images, icons, text, audio, video, 3D models, or other data needed to display the first user interface, and wherein the second application fragment corresponds to a second user interface and includes images, icons, text, audio, video, 3D models, or other data needed to display the second user interface.

7. The method of claim 1, wherein the first application fragment corresponds to a first level of a video game, wherein the second application fragment corresponds to a help portion of the video game, and wherein the second application fragment follows the first application fragment in response to receiving an indication that a user wants help.

8. The method of claim 1, wherein the first application fragment corresponds to a first scene in a video game, wherein the second application fragment corresponds to a second scene in the video game, and wherein the second application fragment follows the first application fragment in response to a transition from the first scene to the second scene.

9. The method of claim 1, wherein the first application fragment corresponds to a first activity in a productivity application, wherein the second application fragment corresponds to a second activity in the productivity application, and wherein the second application fragment follows the first application fragment in response to a transition from the first activity to the second activity.

10. The method of claim 1, wherein the fragments relationship data structure associates multiple next application fragments with the first application fragment to indicate that each of the multiple next application fragments follows the first application fragment, each of the multiple next application fragments respectively following the first application fragment at different times of operation of the computer program.

11. The method of claim 1, wherein the first application fragment was determined based on an analysis of a first user interface by running the computer application on an emulator, that simulates the computer application running on a mobile device, to determine resources needed to display the first user interface.

12. The method of claim 11, wherein the resources needed to display the first user interface include a portion of code of the computer application, images, icons, text, audio, video, and 3D models and wherein the first application fragment includes the portion of the code of the computer application, the images, the icons, the text, the audio, the video, and the 3D models.

13. The method of claim 1, further comprising:
receiving, from the mobile device, resource information indicating that the mobile device has adequate resources to accommodate the second fragment.

14. The method of claim 13, further comprising:
determining an amount of available resources of the mobile device based on the mobile device resource information; and
comparing the amount of the available resources to an amount of resources required for the second application fragment to determine whether the mobile device has adequate resources to accommodate the second application fragment.

15. A method comprising:
receiving and running, by a mobile device, a first application fragment corresponding to a first portion of a computer program, the application fragment having previously been determined based on an analysis of user interfaces of the computer application such that the first application fragment is capable of displaying at least one user interface;
sending, by the mobile device, an indication that the mobile device has adequate resources to accommodate a second application fragment corresponding to a second portion of the computer program; and receiving, by the mobile device, the second application fragment, the second application fragment sent based on the indication that the mobile device has adequate resources to accommodate the second application fragment, and based on data from a fragments data structure indicating that the second application fragment follows the first application fragment during operation of the computer application, wherein the fragment data structure includes one or more application fragments that follow an application fragment during operation of the computer application, the one or more application fragments being determined by running the application through an emulator, the emulator determining the one or more application fragments based on the resource dependency of the one or more application fragments, the resource dependency of a given application fragment being a function of one or more resources required to display at least one user interface associated with the given application fragment, and wherein the emulator enables the splitting of the computer application into the first application fragment and the second application fragment when the resource dependency of a first user interface of the computer application changes from the resource dependency of a second user interface of the computer application, the first application fragment corresponding to the first user interface and the second application fragment corresponding to the second user interface.

16. The method of claim 15, further comprising:
receiving, by the mobile device, a third application fragment, the third application fragment sent based on an indication that the mobile device has adequate resources to accommodate the third application fragment, and based on data from the fragments data structure indicating that the third application fragment follows the first application fragment during operation of the computer application;
running, by the mobile device, the third application fragment in response to an indication that the first application fragment is transitioning to the third application fragment.

17. The method of claim 16, further comprising:
deleting, by the mobile device, the second application fragment without having run the second application fragment.

18. The method of claim 15, further comprising:
sending, by the mobile device, a request for the second application fragment, the mobile device sending the request based on a determination that the mobile device has adequate resources to accommodate the second application fragment, the request indicating that the mobile device has adequate resources to accommodate the second fragment.

19. The method of claim 15, further comprising:
sending, by the mobile device, resource information of the mobile device indicating that the mobile device has adequate resources to accommodate the second application fragment.

20. A system comprising:
a communication device through which to communicate with remote devices;
a storage device;
a processor coupled to the communication device and to the storage device; and
a memory coupled to the processor, the memory storing instructions which when executed by the processor cause the system to perform operations including:
accessing the storage device containing multiple application fragments, each of the application fragments corresponding to a portion of a computer application, the application fragments having previously been determined based on an analysis of user interfaces of the computer application such that each of the application fragments is capable of displaying at least one user interface;
receiving, from a mobile device, a request for a second application fragment,
the mobile device having sent the request based on a determination that the mobile device has adequate resources to accommodate the second application fragment, and
based on a fragments relationship data structure indicating that the second application fragment follows a first application fragment during operation of the computer application;
receiving, from the mobile device, an indication that the mobile device has adequate resources to accommodate the second application fragment, the indication being the request for the second application fragment; and
streaming, via the communication device and to the mobile device, the second application fragment based on the indication that the mobile device has adequate resources to accommodate the second application fragment, and based on the fragments relationship data structure indicating that the second application fragment follows the first application fragment during operation of the computer application,
wherein the first application fragment corresponds to an activity in a first operating environment, wherein the second application fragment corresponds to the activity in a second operating environment, and wherein the second application fragment follows the first application fragment in response to detecting a transition from doing the activity on a first device to doing the activity on a second device, the first device hosting the first operating environment and the second device hosting the second operating environment, the first operating environment being a different type of operating environment from the second operating environment.

21. The system of claim 20, the operations further including:
determining, prior to accessing the storage device containing multiple application fragments, the application fragments based on an analysis of user interfaces of the computer application such that each of the application fragments is capable of displaying at least one user interface.

22. The system of claim 21, the operations further including:
generating the fragments relationship data structure based on a determination of a subset of the application fragments that follow each of the application fragments during operation of the computer application.

23. The system of claim 22, the operations further including:
simulating, using an emulator, the computer application running on the first mobile device to determine the application fragments, and to determine the subset of the application fragments that follow each of the application fragments during operation of the computer application.

* * * * *